US006972719B1

(12) United States Patent
Swope et al.

(10) Patent No.: US 6,972,719 B1
(45) Date of Patent: Dec. 6, 2005

(54) LOCATION DETERMINATION SYSTEM AND METHOD THEREFOR

(75) Inventors: Charles B. Swope, Coral Springs, FL (US); Jason A. Rapps, Tamarac, FL (US); Julio A. Sanchez, Coral Springs, FL (US); Daniel A. Tealdi, Hialeah, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/954,431

(22) Filed: Sep. 30, 2004

(51) Int. Cl.[7] ............................................... G01S 3/02
(52) U.S. Cl. .................................. 342/450; 342/357.02
(58) Field of Search ...................... 342/357.02, 357.06, 342/357.07, 450, 453, 417; 701/207, 213, 701/215

(56) References Cited

U.S. PATENT DOCUMENTS 6,480,152 B2   11/2002   Lin et al.
6,611,755 B1 *  8/2003   Coffee et al. ............... 701/213
2004/0054809 A1 *  3/2004   Goff ........................... 709/248
2004/0203865 A1 * 10/2004   Krasner .................... 455/456.1

* cited by examiner

Primary Examiner—Dao Phan
(74) Attorney, Agent, or Firm—Barbara R. Doutre

(57) ABSTRACT

A location determination system (100) utilizes a low accuracy timing infrastructure (106) to synchronize a personal tracking device (120) having high accuracy timing location determination devices integrated therein. The PTD (120) includes a radio frequency (RF) location unit (102) and integrated sensors, such as altimeter (132), GPS receiver (134) and inertial navigation unit (IMU) (136). The RF location unit (102) receives a synchronization command from the low accuracy timing infrastructure (106) and provides timing data representing range information in response thereto. The range information is used by the high accuracy timing infrastructure (180) to compute updated X, Y, Z coordinates of the PTD (120).

29 Claims, 3 Drawing Sheets

LOCATION DETERMINATION SYSTEM AND METHOD THEREFOR

TECHNICAL FIELD

This invention relates in general to location determination technology and more particularly to the integration of technologies to provide improved accuracy and redundancy in location determination systems.

BACKGROUND

In-building location is fast becoming a critical need in the communication industry's emerging fire ground, corrections and law enforcement markets. Currently, no single portable location technology is capable of wide area coverage, including in-building coverage, with better than three (3) meters of accuracy. Tactical and rescue operations would benefit from improved location accuracy.

A direct spread spectrum (DSS) system is often used as a stand alone approach in location determination of rescue personnel. Although, DSS systems can provide location data, this information is constantly varying in accuracy based on multi-path and environmental factors. In an attempt to improve location determination, attempts have been made to use combinations of technologies such as a global positioning system (GPS) technology with inertial measurement unit (IMU) technology. However, the problem with today's stand-alone and integrated approaches is that they rely on error correction schemes to provide a predictive-corrective approach to navigation. Error correction schemes typically include range information from a site to establish a dot-product velocity of a target, such as a vehicle, for input into a prediction filter, such as a Kalman filter. The filter is needed to compensate for a lack of accuracy in the range information. If an accurate range could be received, then the Kalman filter would not be needed or the amount of filtering could at least be reduced.

Accordingly, there is a need for a location determination system that increases accuracy and provides redundancy while minimizing the need for filtering.

BRIEF DESCRIPTION OF THE DRAWINGS

The features of the present invention, which are believed to be novel, are set forth with particularly in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
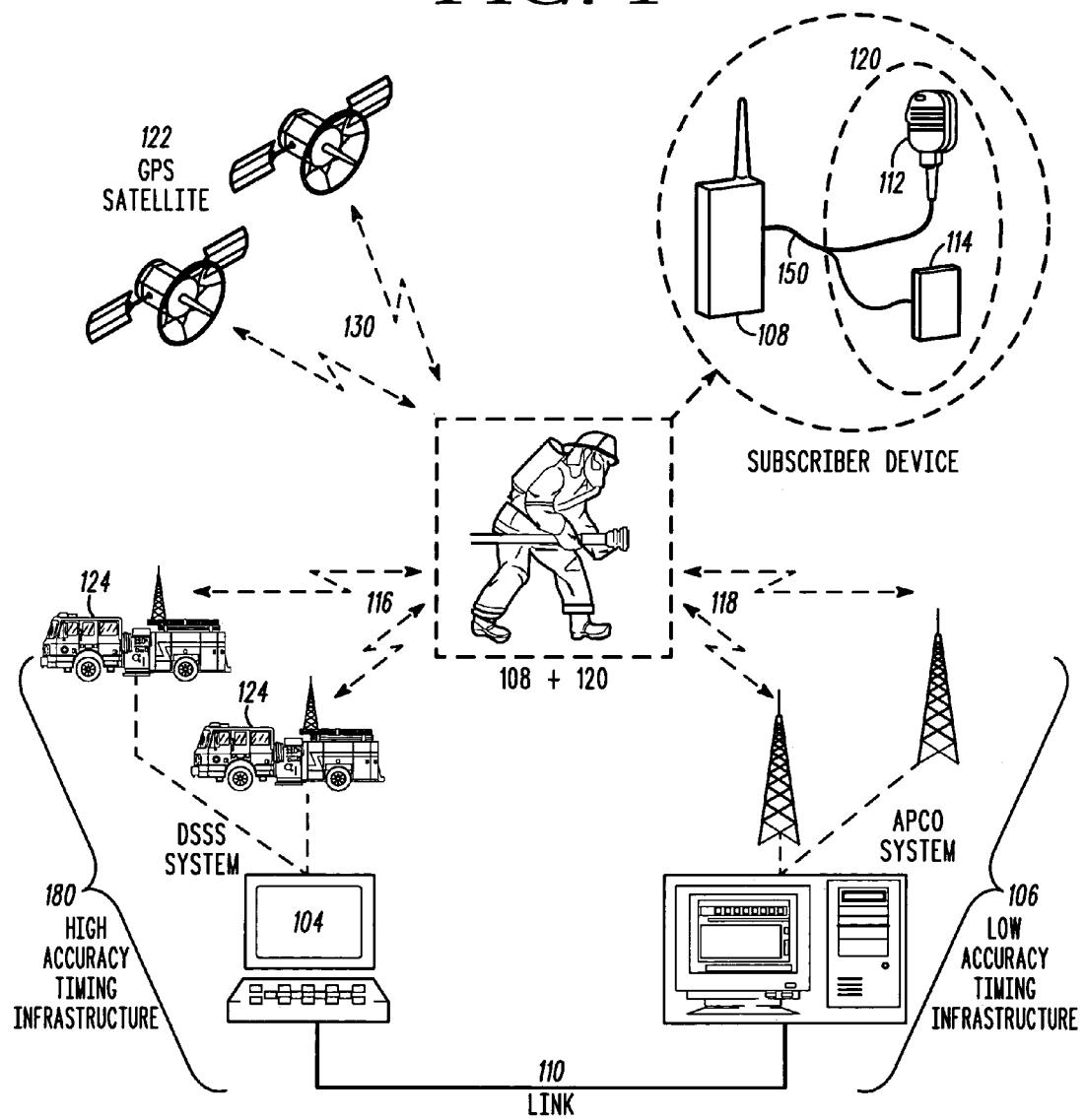
FIG. 1 is a communication system formed in accordance with the present invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein a location determination system and method that integrates location technologies so as to increase accuracy and provide redundancy. The location determination system of the present invention utilizes a low accuracy timing infrastructure to synchronize a personal tracking device worn by a user. The personal tracking device includes a radio frequency (RF) location unit and tracking sensors integrated therein. The RF location unit is synchronized by the low timing infrastructure resulting in the generation of timing data used to establish precise ranging information of the PTD. The ranging information generated from the RF location unit and the location information generated by the sensors provide a higher resolution location determination of the personal tracking device.

FIG. 1 is a location determination system 100 formed in accordance with the present invention. In accordance with the present invention, system 100 includes a low accuracy timing infrastructure 106 linked via link means 110 to a high accuracy timing infrastructure 180 and in communication with a radio 108 having a personal tracking device 120 worn by a user. For the purposes of explanation, the personal tracking device 120 is shown coupled to the radio 108 in the form of a remote speaker microphone and other accessory 114. Personal tracking device 120 can, alternatively, be integrated within one device or even integrated within radio 108.

The high accuracy timing infrastructure 180 is shown represented by an RF location server 104 and DSSS receiver 124, however other known RF location infrastructures having high accuracy timing can also be used. The low accuracy timing infrastructure is presented by an APCO infrastructure, however other low accuracy timing infrastructures can also be used. The PTD 120 is inter-operatively coupled within system 100 via link means 110, which can be wired or wireless, RF link 116 and GPS link 130. Radio 108 is preferably a two-way radio.

In accordance with the present invention, location determination system 100 tracks the location of the PTD 120 with improved accuracy as the user moves into and out of buildings. In order to accomplish the task of providing better than three (3) meter accuracy in-building location, PTD 120 communicates with at least three technologies: GPS, RF location, and inertial navigation as will be described later in conjunction with FIG. 2.

In accordance with the present invention, location tracking is accomplished by utilizing the low accuracy timing infrastructure 106 in collaboration with the plurality of location sensors of the PTD 120 and the high accuracy timing infrastructure 180. In the case of the preferred embodiment, while there is no accurate timing in the APCO infrastructure, the timing can be used to set up timing between the personal tracking device (PTD) 120 and the RF location system.

Figure 2:
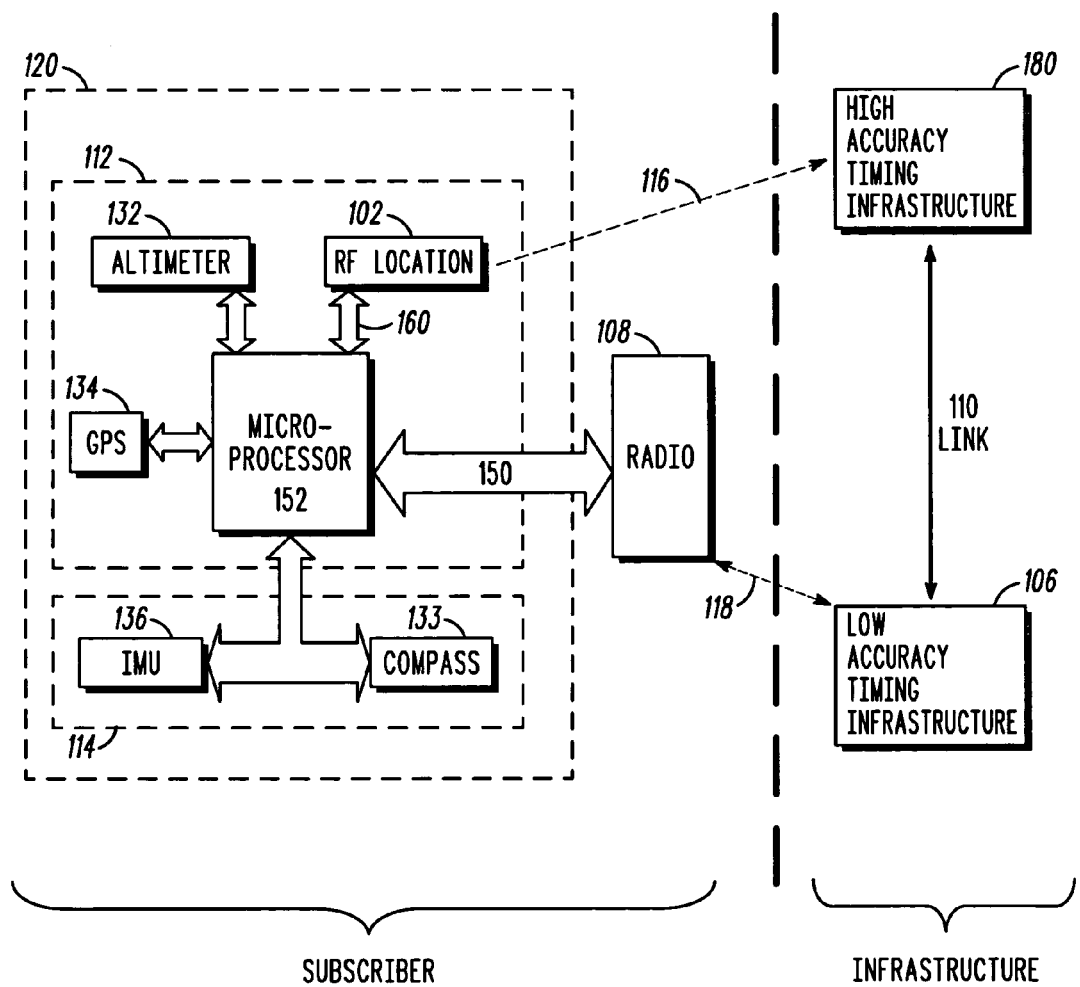
FIG. 2 is a block diagram of a personal tracking device (PTD) within the communication system of FIG. 1 in accordance with the present invention.

FIG. 2 is a block diagram of the personal tracking device 120 shown within location determination system 100 in accordance with the present invention. System 100 shows a subscriber side, including radio 108 and personal tracking device (PTD) 120, in communication with an infrastructure side, formed of high timing accuracy infrastructure 180 and low accuracy timing infrastructure 106. The low accuracy timing infrastructure 106 and high accuracy timing infrastructure 180 are coupled by link means 110. PTD 120 is formed of radio accessories 112, 114 operatively coupled to radio 108. The radio 108 interfaces to the PTD 120 using a low level location protocol.

In accordance with the present invention, an RF location unit 102, along with a plurality of location sensors are integrated within PTD 120. The plurality of tracking sensors includes an altimeter 132, electronic compass 133, GPS receiver 134 and inertial navigation unit (IMU) 136. The personal tracking device (PTD) 120 further includes a controller 152 coupled to a processor within the radio 108 via a wire or wireless interface 150. In accordance with the present invention, the RF location unit 102 and the other location sensors integrated into the PTD 120 provide motion dynamics, navigation state vectors, and both estimated and precise location of a radio user.

The combination of technologies provides superior reliability in location determination as compared to existing technologies. In accordance with the present invention, the low accuracy timing infrastructure 106 synchronizes the high accuracy location unit 102 of PTD 120 utilizing location data packets that transport timing data to establish a higher resolution location. In accordance with the present invention, synchronization commands can originate from either the high accuracy timing infrastructure 180 or the low accuracy timing infrastructure 106.

The case of the synchronization command originating from the high accuracy timing infrastructure 180 is described as follows. The high accuracy timing infrastructure 180 communicates a synchronization command via link means 110 to the low accuracy timing infrastructure 106 that at some specified time in the near future, the high accuracy timing infrastructure 180 will be expecting a transmission from an identified PTD 120. The low accuracy timing infrastructure 106 communicates to the PTD 120 via the RF data channel 118, to set up the transmission at the specified time. Once the time has elapsed, the PTD 120 transmits an RF signal from RF location unit 102, over RF link 116, to high accuracy timing infrastructure 180. Thus, a precise range can be measured from the PTD 120 to the RF infrastructure 180 (not the data system 106). The range measurement is repeated to provide a predetermined number of measured ranges. At that same time, the PTD 120 alerts the radio 108 to transmit a location packet that contains location data obtained from the other integrated sensors, altimeter 132, compass 133, GPS134 and IMU 136.

In accordance with the present invention, high accuracy timing infrastructure 180 computes X, Y, Z location coordinates of the PTD 120 based on the measured ranges. This computation is based on the high accuracy infrastructure's own internal timing and adjusts for the error clocks associated with located within the PTD 120. This computation provides similar accuracies as a two-way RF location system without the use of an additional receiver. A location correction of the PTD 120 based on the X, Y, Z coordinates and the location data obtained from the other integrated location tracking technologies can now be updated at the high accuracy infrastructure's location server 104.

In accordance with the present invention, the PTD unit 120 is the primary tracking unit and the RF location unit 102 only provides updates to the high accuracy timing infrastructure as needed.

In the preferred embodiment, the DSS system is used for precise X, Y, Z (pin-point) locations, the error signal of the DSS system becomes more important. In accordance with the preferred embodiment, the DSS system provides a unit of measure describing the level of accuracy of the latest position. If the accuracy measure is high (meaning that it is precise), then it is used as an update to the location. If not, then it is rejected. Additional processing to filter out error signals, as done in typical DSS systems, is no longer needed thereby providing a significant advantage.

Figure 3:
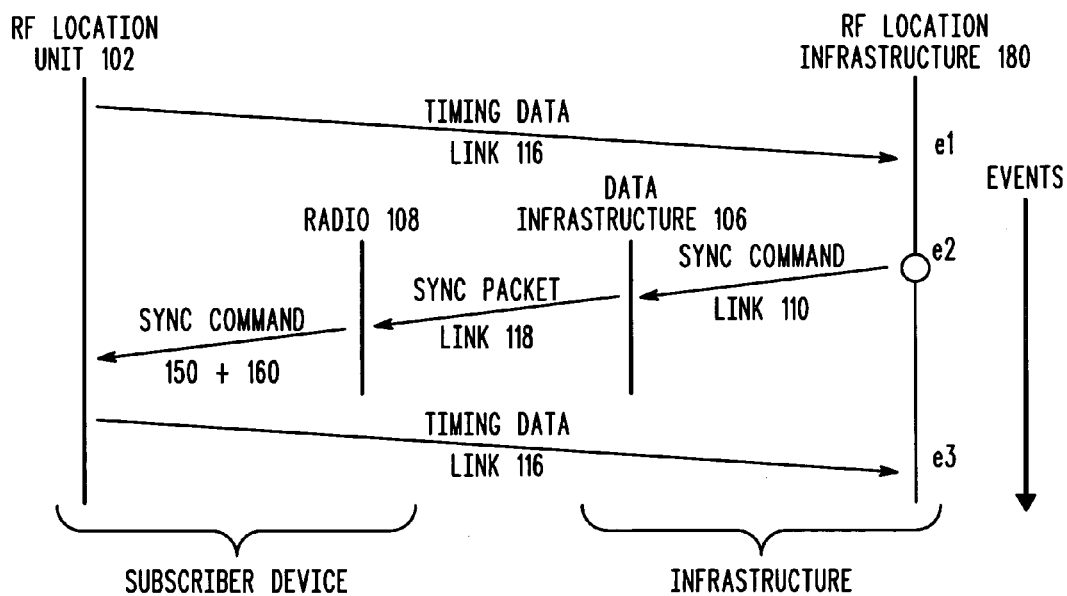
FIG. 3 is a signal flow diagram in accordance with a first embodiment of the invention.

FIG. 3 is a signal flow diagram in accordance with the first embodiment of the invention in which the synchronization command originates from the high accuracy timing infrastructure 180. Beginning with a first event (e1) timing data is transferred from RF location unit 102 to RF location infrastructure 180 via RF link 116. At the second event (e2), RF location infrastructure 180 sends a synchronization command via link means 110 to low accuracy timing infrastructure 106, and then waits for the timing data. Low accuracy timing infrastructure 106 packetizes the synchronization command and sends the packet via RF data channel 118 to radio 108. Radio 108 de-packetizes the synchronization command and sends the synchronization command, via interface 150, controller 152 and interface 160, to RF location unit 102. RF location unit 102 responds to the synchronization command by sending the timing data to RF location infrastructure as the third event (e3). Range information is measured based on the received timing data. Several measurements of range information are taken and the measured ranges are used by the high accuracy timing infrastructure to compute updated X, Y, Z coordinates of the PTD.

Figure 4:
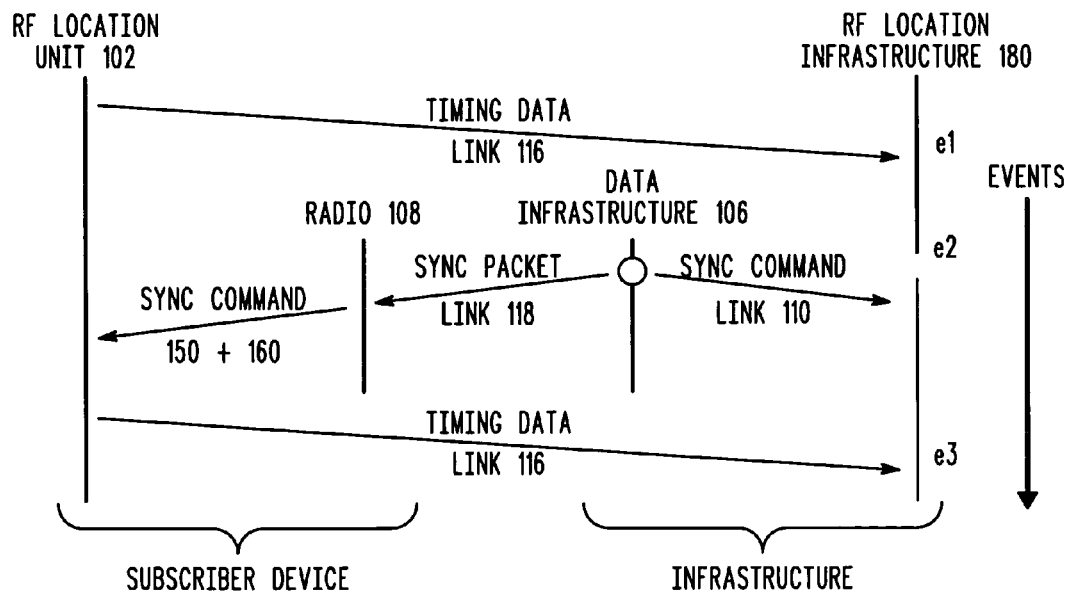
FIG. 4 is a signal flow timing diagram in accordance with a second embodiment of the invention.

FIG. 4 is a signal flow timing diagram in accordance with the second embodiment of the invention in which the synchronization command originates from the low accuracy timing infrastructure 106. Beginning with a first event (e1), timing data is transferred from RF location unit 102 to RF location infrastructure 180 via RF link 116. At the second event (e2), low timing accuracy infrastructure 106 sends out a synchronization command and a timing request. Low accuracy timing infrastructure 106 packetizes the synchronization command and sends the packet via RF data channel 118 to radio 108. Radio 108 de-packetizes the synchronization command and sends it, via interface 150, controller 152 and interface 160, to RF location unit 102. Meanwhile, the timing request is sent via link 110 to high accuracy timing infrastructure 180 to notify the high accuracy timing infrastructure 180 that it can expect incoming range information at a predetermined time in the future. The high accuracy timing infrastructure 180 thus anticipates the timing data based on the timing request. RF location unit 102 responds to the synchronization command by sending the timing data to the high accuracy timing infrastructure as the third event (e3). Range information is measured based on the received timing data. Several range measurements are taken and then used by the high accuracy timing infrastructure 180 to compute updated X, Y, Z coordinates of the PTD.

Accordingly, there has been provided a location determination system that provides superior location tracking capability through the use of a portable tracking device, a low accuracy timing infrastructure linked to a high accuracy timing infrastructure and the use of low level location protocol. By utilizing the low accuracy timing infrastructure to synchronize high accuracy timing location devices, the benefits of a low cost system with high accuracy is achieved.

While the preferred embodiment described the high accuracy timing infrastructure as a DSSS infrastructure and the low accuracy timing infrastructure as an APCO infrastructure, the location determination system formed in accordance with the present invention can utilize beacons or other RF infrastructure in place of the DSSS infrastructure and can utilize other low accuracy timing infrastructure in place of APCO, such as TETRA or other two-way trunked wireless systems.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A personal tracking device (PTD) for use in a location determination system, comprising:
   a controller;
   a radio frequency (RF) location unit and a plurality of location sensors coupled to the controller; and
   the RF location unit receiving a synchronization command from a low accuracy timing infrastructure and transmitting timing data representing ranging information to a high accuracy timing infrastructure in response thereto.

2. A personal tracking device for use in a location determination system as described in claim 1, wherein the ranging information is used by the high accuracy timing infrastructure to compute updated X, Y, Z coordinates of the PTD.

3. A personal tracking device for use in a location determination system as described in claim 1, wherein the plurality of integrated location sensors provide location data to the low accuracy timing infrastructure, and wherein the updated X, Y, Z coordinates and the location data provide an updated location determination of the PTD.

4. A personal tracking device for use in a location determination system as described in claim 1, wherein a link couples the high accuracy timing infrastructure to the low accuracy timing infrastructure.

5. The location determination apparatus of claim 4, wherein the synchronization command originates from the high accuracy timing infrastructure and is transmitted to the low accuracy timing infrastructure via the link, the low accuracy timing infrastructure then transmitting the synchronization command to the RF location unit, the RF location unit transmitting the timing data to the high accuracy timing infrastructure in response thereto.

6. A personal tracking device for use in a location determination system as described in claim 4, wherein the synchronization command originates from the low accuracy timing infrastructure along with a timing request, the synchronization command being transmitted to the RF location unit via an RF data channel while the timing request is sent to the high accuracy timing infrastructure via the link, the RF location unit transmitting the timing data to the high accuracy timing infrastructure in response to the synchronization command, and the high accuracy timing infrastructure anticipating the timing data based on the timing request.

7. A location determination system, comprising:
   a portable tracking device (PTD);
   a radio frequency (RF) location unit integrated into the portable tracking device;
   a low accuracy timing infrastructure;
   a high accuracy timing infrastructure linked to the low accuracy timing infrastructure; and
   wherein the RF location unit transmits timing data to the high accuracy timing infrastructure in response to a synchronization command being received from the low accuracy timing infrastructure.

8. The location determination apparatus of claim 7, wherein the low accuracy timing infrastructure comprises a data infrastructure.

9. The location determination apparatus of claim 8, wherein the data infrastructure comprises a Public-Safety Communications Officials (APCO) infrastructure.

10. The location determination apparatus of claim 7, wherein the radio frequency (RF) location unit comprises a high accuracy timing location unit.

11. The location determination apparatus of claim 10, wherein the PTD further includes a plurality of location sensors providing location data to the low accuracy timing infrastructure.

12. The location determination apparatus of claim 11, wherein the plurality of location sensors includes: an altimeter, a GPS receiver, and inertial navigation unit (IMU).

13. The location determination apparatus of claim 12, wherein the location data includes motion dynamics, navigation state vectors and location of the user, the location data being transferred to the low accuracy timing infrastructure via an RF data channel.

14. The location determination system of claim 7, wherein the synchronization command originates from the high accuracy timing infrastructure and is sent to the low accuracy timing infrastructure via the link and then proceeds from the low accuracy timing infrastructure to the RF location unit.

15. The location determination system of claim 7, wherein the synchronization command originates from the low accuracy timing infrastructure in conjunction with a timing request, the synchronization command being sent from the low accuracy timing infrastructure to the RF location unit via a radio frequency (RF) data channel while the timing request is sent from the low accuracy timing infrastructure to the high accuracy timing infrastructure over the link.

16. A method for updating location in a location determination system comprising the steps of:
   providing a link between a low accuracy timing infrastructure and a high accuracy timing infrastructure;
   providing a personal tracking device (PTD) having a radio frequency (RF) location unit integrated therein;
   sending a synchronization command via the link to the RF location unit;
   transmitting timing data representing ranging from the RF location unit to the high accuracy timing infrastructure; and
   determining X, Y, Z coordinates of the PTD at the high accuracy timing infrastructure.

17. The method of claim 16, wherein the step of sending the synchronization command comprises the steps of:
   sending the synchronization command from the high accuracy timing infrastructure via the link to the low accuracy timing infrastructure; and
   sending the synchronization command to the RF location unit.

18. The method of claim 16 wherein the step of sending the synchronization command comprises the steps of:
   sending the synchronization command from the low accuracy timing infrastructure to the RF location unit via an RF data channel; and
   simultaneously sending a timing request from the low accuracy timing infrastructure to the high accuracy timing infrastructure via the link.

19. A method for updating location in a location determination system comprising the steps of:
   providing a personal tracking device (PTD) having RF location tracking capability and other integrated location tracking technologies, an RF location infrastructure including a location server, and a Public-Safety Communications Officials (APCO) infrastructure operatively coupled to the RF location infrastructure;
   communicating from the APCO infrastructure to the PTD via an RF data channel, to set up a transmission at a specified time in the future;
   once the specified time has elapsed, transmitting an RF signal from the PTD to the RF location infrastructure, and at that same time, the PTD transmitting location data to the APCO infrastructure obtained from the other integrated location tracking technologies;
   measuring the range from the PTD to the RF location infrastructure based on the RF signal;
   repeating the step of measuring the range to provide a predetermined number of measured ranges;
   computing, at the location server, an X, Y, Z location of the PTD based on the measured ranges; and
   updating, at the location server, a location correction of the PTD based on the X, Y, Z coordinates and the location data obtained from the other integrated location tracking technologies.

20. The method of claim 19, wherein the specified time in the future is determined by the location server and communicated to the APCO infrastructure.

21. The method of claim 19, wherein the specified time in the future is determined by the APCO infrastructure, and the step of communicating further comprises the step of communicating from the APCO infrastructure to the location server that the location server will receive a transmission from the PTD at the specified time in the future.

22. The method of claim 19, wherein the RF location infrastructure comprises direct sequence spread spectrum (DSSS) infrastructure.

23. A location determination system, comprising:
   a portable tracking device (PTD) having a plurality of tracking sensors integrated therein along with a radio frequency (RF) location unit;
   a low accuracy timing infrastructure for receiving location data from the plurality of tracking sensors and for providing a synchronization command to the RF location unit; and
   a high accuracy timing infrastructure linked to the low accuracy timing infrastructure, the RF location unit providing timing data used to measure ranging information at the high accuracy timing infrastructure in response to the synchronization command, the ranging information and location data are used to determine an updated location of the PTD.

24. The location determination system of claim 23, wherein the synchronization command originates from the high accuracy timing infrastructure.

25. The location determination system of claim 23, wherein the synchronization command originates from the low accuracy timing infrastructure.

26. The location determination system of claim 23, wherein the ranging information is used to compute updated X, Y, Z coordinates of the PTD.

27. The location determination system of claim 26, wherein the X, Y, Z coordinates are computed by a location server.

28. The location determination system of claim 23, wherein the low accuracy timing infrastructure comprises a Public-Safety Communications Officials (APCO) infrastructure.

29. The location determination system of claim 23, wherein the low accuracy timing infrastructure comprises a TETRA infrastructure.

* * * * *